United States Patent Office 2,813,014
Patented Nov. 12, 1957

2,813,014

PLANT TONIC CONSISTING OF AMMONIUM SULFATE, FERROUS SULFATE, AND CITRIC ACID

John R. Allison, Whittier, and Charles A. Hewitt, Buena Park, Calif., assignors to Leffingwell Chemical Company, Whittier, Calif., a corporation of California No Drawing. Application March 21, 1955,
Serial No. 495,762

4 Claims. (Cl. 71—11)

This invention has to do with new chemical compositions and their use for benefitting the growth or other condition of various plants, particularly with respect to their nitrogen and iron acceptance and the relief of various deficiencies, as evidenced typically by "yellow leaf" and lime-induced chlorosis caused by improper or inadequate nitrogen and iron assimilation by the plant, and due usually to soil deficiencies including the unavailability of iron in a form or state utilizable by the plant.

After extensive experimentation and observation of results, the invention has proven to have outstanding success in relieving deficiencies of assimilatable iron in high lime soils, and the plant-yellowing effects of the so-called lime-induced chlorosis, with respect to a variety of plants including not only small plants such as gardenias, azaleas, roses, dwarf citrus, aralias, begonias, strawberries, camellias, fittonias, grasses, dichondra and the like, but also large plants or trees such as avocados, citrus, peaches and other deciduous trees.

The invention is concerned primarily with the problem of making available to the plants in such quantities and over such time periods as may be necessary, iron in a condition unimpaired by such chemical combinations as will interfere with its existence as such, which is capable of assimilation by the plants and has the effect of restoring a normal nitrogen and iron acceptance and healthy growth and green coloring of the plant foliage. We have found that in order for the iron to be made so available, it must not only be derived from a soluble ionizable form, but the ionized or chelated iron must be maintained as such and against becoming insolubilized or combined in any of various forms that would destroy its capacity for assimilation by the plants. Thus the invention is concerned with first putting the iron into solution, and then retaining or chelating the iron after introduction to the soil and until taken by the plant at natural rates of assimilation in the required quantities.

The source of iron employed in the present composition is ferrous sulfate, used because of its solubility and capacity for chelation of the iron ion by the acidic component in the mixture. It may be mentioned that ferrous sulfate has been used in the past as an iron supplement for plants, but our investigations indicate that ferrous sulfate as such, or in such combinations with fertilizers as used in the past, have had limited success and the results have been definitely inferior to those obtainable in accordance with the present invention, apparently because of the inability after solubilizing the iron, to retain or chelate it in a condition such that the iron will remain available in impaired environments, such as high lime soils, for the length of time required for assimilation by the plants.

Together with ferrous sulfate, we use citric acid principally by reason of its apparent effectiveness as a chelating compound for solubilized iron, and for the further benefit of lowering to a desirable level the pH of high alkaline soils. When used even in relatively small proportions, citric acid chelates the iron so effectively that when the combination of materials is dissolved and introduced to the soil, the iron is retained by the chelation for assimilation by the plants over a period of time well beyond that at which the iron could remain so available in the absence of the citric acid.

The third essential ingredient of the present composition is ammonium sulfate, which is used for the dual purposes of increasing the chelation effect of the citric acid, as by the formation of a complex of the salts having chelative relation to iron, and for the further purpose of making available nitrogen which becomes assimilable by the plant by virtue of its acceptance of the iron.

After extensive experimentation it has been found that most effective solubilizing and chelating retention of the iron, and best consequent responsiveness of the plants because of iron assimilation, are obtained by carefully controlled proportioning of the ferrous sulfate, ammonium sulfate and citric acid. Considering variations in soil composition and alkalinity, and differences between the kinds of plants to be benefitted, we control the relative proportions of the components within the weight ratio of about 1 part of ammonium sulfate to from 2 to 7 parts of ferrous sulfate, and about 0.12 to 0.80 part of citric acid. As a preferred specific formulation we mix the ingredients in about the following proportions: 1 part of citric acid, 4.6 parts of ammonium sulfate and 22.75 parts of ferrous sulfate. The acid and salts may be packaged and sold dry in finely granular or powdered form as may be desired for ready dissolution in water. Typically, for application to a high lime soil, about one ounce of the mixture may be dissolved in each gallon of water.

Ordinarily it is preferred to introduce an aqueous solution of the composition to the soil in the direct vicinity of plants or trees, as by irrigation, surface sprinkling or soil injection. As illustrative, where the composition is to be fed to small tree transplants, we may use about one-half pound of the mixture per tree. In the case of very large trees, the dosage may be increased to as high as 20 pounds. The average dosage will be between about 5 to 10 pounds per tree, depending upon the size and condition of the tree. For the feeding of vegetables, the mixture may be applied in amounts ranging between about 150 to 200 pounds per acre, in irrigation water or as a side dressing.

Applied to the soil in concentrations and by the methods described, the invention may be employed with definite success for any of such purposes as correction of iron deficiency (yellow leaf), correction or lowering of alkalinity, promotion of health and vigor in all weak trees, plants and grasses suffering from iron chlorosis or alkalinity, and to maintain health and vigor in young trees as a definite aid in transplanting.

We claim:

1. A soil conditioning material consisting essentially of ammonium sulfate, ferrous sulfate and citric acid in the proportions of about 1 weight part of ammonium sulfate, from 2 to 7 parts of ferrous sulfate and from 0.12 to 0.8 part of citric acid, iron contained in said ferrous sulfate being chelated by the citric acid and retained as unprecipitated iron in aqueous solutions of said material.

2. A soil conditioning material consisting essentially of ammonium sulfate, ferrous sulfate and citric acid in the proportions of about 4.6 weight parts of ammonium sulfate, 22.75 parts of ferrous sulfate and 1 part of citric acid, iron contained in said ferrous sulfate being chelated by the citric acid and retained as unprecipitated iron in aqueous solutions of said material.

3. The method of treating plants growing in high lime soils to improve their nitrogen and iron acceptance, that includes applying to the soil an aqueous solution consisting essentially of ammonium sulfate, ferrous sulfate and citric acid dissolved in water in the proportions of about 1 weight part of ammonium sulfate, from 2 to 7 parts of ferrous sulfate and from 0.12 to 0.8 parts of citric acid, iron contained in said ferrous sulfate being chelated by the citric acid and retained as unprecipitated iron in aqueous solutions of said material.

4. The method of treating plants growing in high lime soils to improve their nitrogen and iron acceptance, that includes applying to the soil an aqueous solution consisting essentially of ammonium sulfate, ferrous sulfate and citric acid dissolved in water in the proportions of about 4.6 weight parts of ammonium sulfate, 22.75 parts of ferrous sulfate and 1 part of citric acid, iron contained in said ferrous sulfate being chelated by the citric acid and retained as unprecipitated iron in aqueous solutions of said material.

References Cited in the file of this patent

UNITED STATES PATENTS

| | | |
|---|---|---|
| 1,950,068 | Spangenberg | Mar. 5, 1934 |
| 1,966,947 | Eyer et al. | July 17, 1934 |
| 2,673,795 | Hudson | Mar. 30, 1954 |

OTHER REFERENCES

Science, "Chelates as Sources for Iron for Plants Growing in the Field," Stewart et al., vol. 116, November 1952.